(12) United States Patent
Xie

(10) Patent No.: US 9,890,051 B2
(45) Date of Patent: Feb. 13, 2018

(54) SYNTHESIS OF ZEOLITE SSZ-31

(71) Applicant: Chevron U.S.A. Inc., San Ramon, CA (US)

(72) Inventor: Dan Xie, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 15/416,082

(22) Filed: Jan. 26, 2017

(65) Prior Publication Data

US 2017/0305753 A1 Oct. 26, 2017

Related U.S. Application Data

(60) Provisional application No. 62/325,510, filed on Apr. 21, 2016.

(51) Int. Cl.
| | |
|---|---|
| *C01B 39/48* | (2006.01) |
| *B01J 29/70* | (2006.01) |
| *B01J 20/18* | (2006.01) |
| *B01J 20/30* | (2006.01) |

(52) U.S. Cl.
CPC ............. *C01B 39/48* (2013.01); *B01J 20/18* (2013.01); *B01J 20/3057* (2013.01); *B01J 29/70* (2013.01)

(58) Field of Classification Search
CPC ....... C01B 39/48; B01J 20/18; B01J 20/3057; B01J 29/70
See application file for complete search history.

(56) References Cited

U.S. PATENT DOCUMENTS

| | | | |
|---|---|---|---|
| 5,106,801 A | 4/1992 | Zones et al. | |
| 5,215,648 A | 6/1993 | Zones et al. | |
| 6,086,848 A * | 7/2000 | Nakagawa | ............... B01J 29/04 423/706 |
| 6,471,940 B1 | 10/2002 | Kurata et al. | |
| 9,512,010 B2 * | 12/2016 | Davis | ...................... C01B 39/48 |

OTHER PUBLICATIONS

R.F. Lobo, M. Tsapatsis, C.C. Freyhardt, I. Chan, C-Y. Chen, S.I. Zones, and M. Davis "A Model for the Structure of the Large-Pore Zeolite SSZ-31" J. Am. Chem. Soc. 1997, 119, 3732-3744.
H. Van Koningsveld and R.F. Lobo "Disorder in Zeolite SSZ-31 Described on the Basis of One-Dimensional Building Units" J. Phys. Chem. B 2003, 107, 10983-10989.

* cited by examiner

*Primary Examiner* — David M Brunsman
(74) *Attorney, Agent, or Firm* — Terrence M. Flaherty

(57) ABSTRACT

A zeolite having the framework structure of SSZ-31 is synthesized using 1-cyclohexylmethyl-1-ethylpiperidinium cations as a structure directing agent.

7 Claims, 2 Drawing Sheets

SYNTHESIS OF ZEOLITE SSZ-31

TECHNICAL FIELD

The present disclosure is to a method of synthesizing zeolite SSZ-31 using 1-cyclohexylmethyl-1-ethylpiperidinium cations as a structure directing agent.

BACKGROUND

Molecular sieves are a commercially important class of crystalline materials. They have distinct crystal structures with ordered pore structures which are demonstrated by distinct X-ray diffraction patterns. The crystal structure defines cavities and pores which are characteristic of the different species. Molecular sieves such as zeolites have been used extensively to catalyze a number of chemical reactions in refinery and petrochemical reactions, and catalysis, adsorption, separation, and chromatography.

SSZ-31 is a high-silica molecular sieve material with a large one-dimensional pore system. The pore apertures are elliptical with a dimension of approximately 8.6×5.7 Å. The structure of SSZ-31 is highly faulted and can be described as an intergrowth of four different but structurally related polymorphs.

The framework structure of SSZ-31 has been assigned the three letter code *STO by the Structure Commission of the International Zeolite Association.

The composition and characterizing powder X-ray diffraction pattern of SSZ-31 are disclosed in U.S. Pat. No. 5,106,801, which also describes the synthesis of the borosilicate form of the zeolite in the presence of a structure directing agent selected from one or more of N,N,N-trimethylammonium-8-tricyclo[5.2.1.0]decane, 4-trimethylammonium-2,2,6,6-tetramethylpiperidine, N,N-dimethyl-3-azonium bicyclo[3.2.2]nonane, N,N,N-trimethylammonium-2-bicyclo[3.2.1]octane, N,N-dimethyl-6-azonium-1,3,3-trimethylbicyclo[3.2.1]octane, and 1,1,3,5,5-pentamethyl azonium cycloheptane. An all-silica form of SSZ-31 was also synthesized using N,N,N-trimethylammonium-8-tricyclo[5.2.1.0]decane as a structure directing agent.

Due to the very large pore diameter of SSZ-31, aluminum-containing forms of SSZ-31 are of interest for shape-selective catalysis, such as alkylation of relatively bulky aromatic compounds. Aluminosilicate SSZ-31 may be prepared from borosilicate SSZ-31 by heteroatom lattice substitution techniques such as described in U.S. Pat. Nos. 6,468,501 and 6,790,433.

U.S. Pat. No. 6,471,940 discloses the direct synthesis of aluminosilicate SSZ-31 by a dry gel conversion method using a structure directing agent selected from one of more of N,N'-bis-triethyl-1,6-hexanediyl-diammonium dihydroxide, N,N'-bis-triethyl-1,7-heptanediyl-diammonium dihydroxide, N,N'-bis-triethyl-1,8-octanediyl-diammonium dihydroxide, N,N'-bis-triethyl-1,9-nonanediyl-diammonium dihydroxide, and N,N'-bis-triethyl-1,10-decanediyl-diammonium dihydroxide.

According to the present disclosure, it has now been found that 1-cyclohexylmethyl-1-ethylpiperidinium cations are effective as structure directing agent in the direct synthesis of all-silica and aluminosilicate forms of zeolite SSZ-31.

SUMMARY

In one aspect, there is provided a method of synthesizing a zeolite having the framework structure of SSZ-31, the method comprising: (a) preparing a reaction mixture comprising: (1) a source of silicon oxide; (2) optionally, a source of aluminum oxide; (3) a structure directing agent comprising 1-cyclohexylmethyl-1-ethylpiperidinium cations; (4) hydroxide ions; and (5) water; and (b) subjecting the reaction mixture to crystallization condition sufficient to form crystals of the zeolite.

In another aspect, there is provided a zeolite having the framework structure of SSZ-31 and comprising 1-cyclohexylmethyl-1-ethylpiperidinium cations in its pores.

In its as-synthesized and anhydrous form, the zeolite has a chemical composition comprising the following molar relationship:

|  | Broad | Exemplary |
| --- | --- | --- |
| $SiO_2/Al_2O_3$ | ≥50 | 100 to 500 |
| $Q/SiO_2$ | >0 to 0.2 | >0 to 0.1 | wherein Q comprises 1-cyclohexylmethyl-1-ethylpiperidinium cations.

DETAILED DESCRIPTION

Introduction

Figure 1:
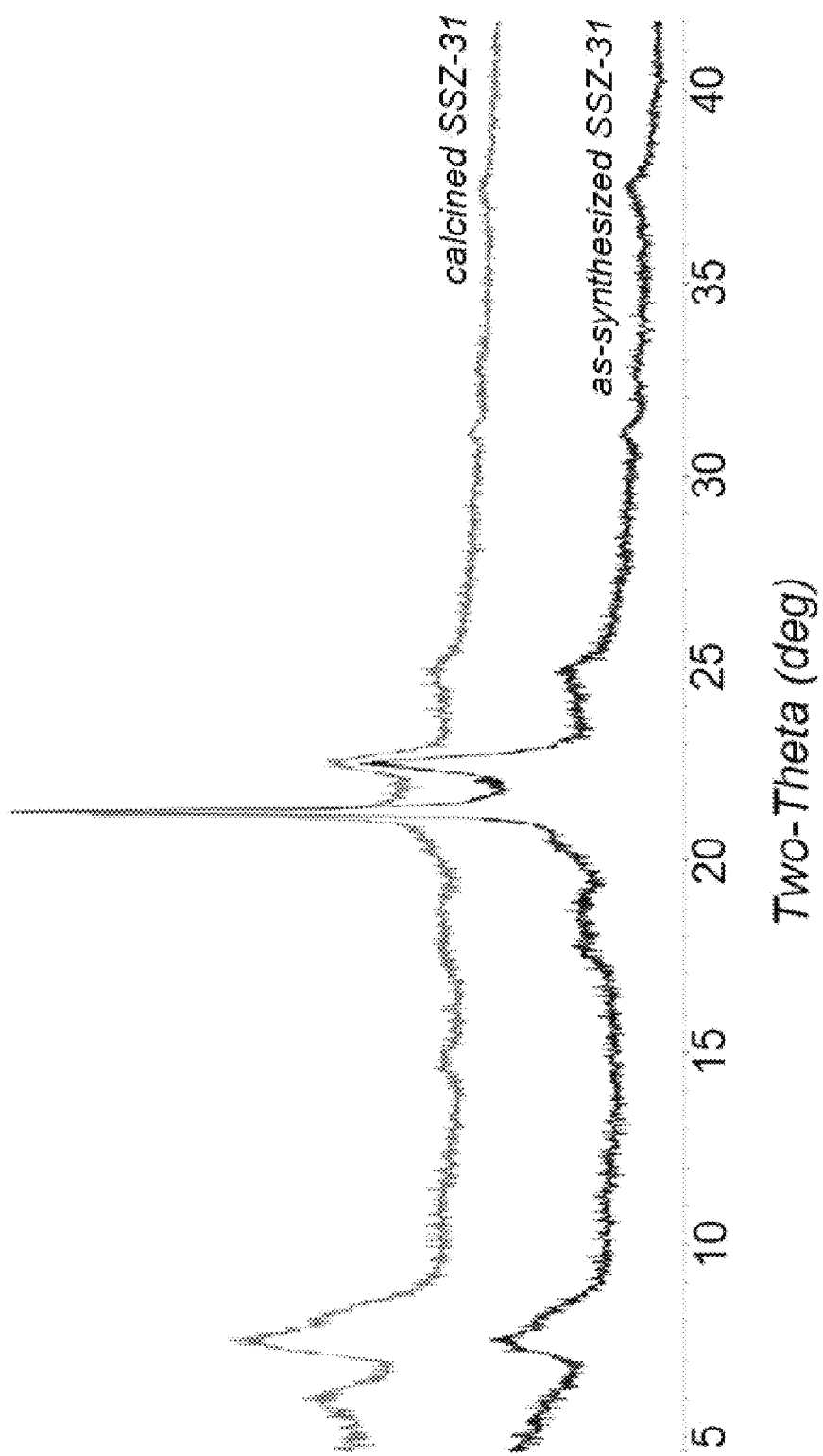
FIG. 1 compares the powder X-ray diffraction (XRD) patterns of the zeolite product of Example 1 in its-as-synthesized form (bottom pattern) and in its calcined form (top pattern).

The term "as-synthesized" is employed herein to refer to a zeolite in its form after crystallization, prior to removal of the structure directing agent.

The term "anhydrous" is employed herein to refer to a zeolite substantially devoid of both physically adsorbed and chemically adsorbed water.

As used herein, the numbering scheme for the Periodic Table Groups is as disclosed in *Chem. Eng. News* 1985, 63(5), 26-27.

Reaction Mixture

All-silica and aluminosilicate forms of zeolite SSZ-31 can be directly synthesized from an aqueous reaction mixture comprising 1-cyclohexylmethyl-1-ethylpiperidinium cations, as described herein below. The term "directly synthesized" in the context of the present disclosure means that the zeolite is formed from the reaction mixture described below, as opposed to forming a zeolite containing silicon oxide and another oxide (e.g., boron oxide) and then subjecting the thus-formed zeolite to a post-synthesis treatment to create an all-silica or aluminosilicate SSZ-31 zeolite.

In general, the present zeolite is synthesized by: (a) preparing a reaction mixture comprising (1) a source of silicon oxide; (2) optionally, a source of aluminum oxide; (3) a structure directing agent (Q) comprising 1-cyclohexylmethyl-1-ethylpiperidinium cations; (4) hydroxide ions; and (5) water; and (b) subjecting the reaction mixture to crystallization conditions sufficient to form crystals of the zeolite.

The composition of the reaction mixture from which the zeolite is formed, in terms of mole ratios, is identified in Table 1 below:

TABLE 1

| Reactants | Useful | Exemplary |
|---|---|---|
| SiO$_2$/Al$_2$O$_3$ | ≥50 | 100 to 500 |
| Q/SiO$_2$ | 0.05 to 0.50 | 0.10 to 0.45 |
| OH/SiO$_2$ | 0.05 to 0.50 | 0.20 to 0.45 |
| H$_2$O/SiO$_2$ | 10 to 60 | 15 to 50 | wherein Q and M are as described herein above.

Suitable sources of silicon oxide include fumed silica, colloidal silica, precipitated silica, alkali metal silicates, and tetraalkyl orthosilicates.

Suitable sources of aluminum oxide include hydrated alumina and water-soluble aluminum salts (e.g., aluminum nitrate).

Combined sources of silicon and aluminum can additionally or alternatively be used and can include aluminosilicate zeolites (e.g., zeolite Y).

The organic structure directing agent (Q) comprises 1-cyclohexylmethyl-1-ethylpiperidinium cations, represented by the following structure (1):

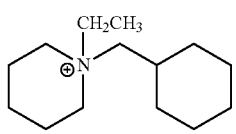

(1)

Suitable sources of Q include the hydroxides, chlorides, bromides, and/or other salts of the quaternary ammonium compound.

The reaction mixture also contains a source of hydroxide ions, for example, an alkali metal hydroxide (e.g., NaOH or KOH). Hydroxide can also be present as a counter ion of the structure directing agent.

The reaction mixture may also contain seeds of a molecular sieve material, such as SSZ-31, from a previous synthesis, desirably in an amount of from 0.01 to 10,000 ppm by weight (e.g., from 100 to 5000 ppm by weight) of the reaction mixture.

For each embodiment described herein, the reaction mixture can be supplied by more than one source. Also, two or more reaction components can be provided by one source.

The reaction mixture can be prepared either batch wise or continuously. Crystal size, morphology and crystallization time of the crystalline zeolite described herein can vary with the nature of the reaction mixture and the crystallization conditions.

Crystallization and Post-Synthesis Treatment

Crystallization of the zeolite can be carried out under either static, tumbled or stirred conditions in a suitable reactor vessel, such as for example polypropylene jars or Teflon-lined or stainless steel autoclaves, at a temperature of from 125° C. to 200° C. for a time sufficient for crystallization to occur at the temperature used, e.g., from 1 day to 28 days. Crystallization is usually carried out in closed system under autogenous pressure.

Once the zeolite crystals have formed, the solid product is recovered from the reaction mixture by standard mechanical separation techniques such as centrifugation or filtration. The crystals are water-washed and then dried to obtain the as-synthesized zeolite crystals. The drying step is typically performed at a temperature of less than 200° C.

As a result of the crystallization process, the recovered crystalline zeolite product contains within its pore structure at least a portion of the structure directing agent used in the synthesis.

The as-synthesized zeolite described may be subjected to treatment to remove part or all of the organic structure directing agent (Q) used in its synthesis. This is conveniently effected by thermal treatment in which the as-synthesized material is heated at a temperature of at least about 370° C. for at least 1 minute and generally not longer than 20 hours. The thermal treatment can be performed at a temperature up to about 925° C. While sub-atmospheric pressure can be employed for the thermal treatment, atmospheric pressure is desired for reasons of convenience. Additionally or alternatively, the organic structure directing agent can be removed by treatment with ozone (see, e.g., A. N. Parikh et al., *Micropor. Mesopor. Mater.* 2004, 76, 17-22).

To the extent desired and depending on the SiO$_2$/Al$_2$O$_3$ mole ratio of the material, any extra-framework cations (e.g., Group 1 or 2 metal cations) in the as-synthesized zeolite can be replaced in accordance with techniques well known in the art by ion exchange with other cations. Illustrative examples of suitable replacing cations include metal ions, hydrogen ions, hydrogen precursor ions (e.g., ammonium ions), and mixtures thereof. Particularly preferred replacing cations are those which tailor the catalytic activity for certain organic conversion reactions. These include hydrogen, rare earth metals and metals of Groups 2 to 15 of the Periodic Table of the Elements.

Characterization of the Zeolite

In its as-synthesized and anhydrous form, the zeolite prepared by the method described herein has a chemical composition comprising the following molar relationship:

| | Broad | Exemplary |
|---|---|---|
| SiO$_2$/Al$_2$O$_3$ | ≥50 | 100 to 500 |
| Q/SiO$_2$ | >0 to 0.2 | >0 to 0.1 | wherein Q comprises 1-cyclohexylmethyl-1-ethylpiperidinium cations. In some embodiments, the zeolite has a SiO$_2$/Al$_2$O$_3$ molar ratio of at least 100 (e.g., at least 200, 100 to 1000, 100 to 300, 200 to 1000, 200 to 500, or 200 to 300). It will be appreciated from the permitted values for the SiO$_2$/Al$_2$O$_3$ molar ratio that the zeolite can be synthesized in a totally siliceous form (i.e., an "all-silica" form) in which aluminum oxide is absent or essentially absent from the framework of the zeolite.

As taught by U.S. Pat. No. 5,106,801, zeolite SSZ-31 has, in its as-synthesized form, an X-ray diffraction pattern which includes at least the peaks set forth in Table 2 below.

TABLE 2

Characteristic Peaks for As-Synthesized SSZ-31

| 2-Theta[a] | d-spacing (nm) | Relative Intensity[b] |
|---|---|---|
| 6.10 | 1.449 | W |
| 7.38 | 1.198 | M |
| 8.18 | 1.081 | W |
| 20.30 | 0.437 | W |
| 21.12 | 0.421 | VS |
| 22.25 | 0.399 | VS |
| 24.73 | 0.360 | M |
| 30.90 | 0.289 | W |

[a]±0.20
[b]The powder X-ray diffraction patterns provided are based on a relative intensity scale in which the strongest line in the XRD pattern is assigned a value of 100: W = weak (>0 to ≤20); M = medium (>20 to ≤40); S = strong (>40 to ≤60); VS = very strong (>60 to ≤100).

The powder X-ray diffraction patterns presented herein were collected by standard techniques. The radiation was CuK$_\alpha$ radiation. The peak heights and the positions, as a function of 2θ where θ is the Bragg angle, were read from the relative intensities of the peaks, and d, the interplanar spacing corresponding to the recorded lines, can be calculated.

Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can result from variations in the organic compound used in the preparation. Calcination can also cause minor shifts in the X-ray diffraction pattern.

EXAMPLES

The following illustrative examples are intended to be non-limiting.

Example 1

Synthesis of All-Silica SSZ-31

6.29 g of deionized water, 5.64 g of a 20.12% 1-cyclohexylmethyl-1-ethylpiperidinium hydroxide solution (SACHEM, Inc.) and 3.00 g of LUDOX® AS-40 colloidal silica were mixed together in a Teflon liner. The resulting gel was stirred until it became homogeneous. The liner was then capped and placed within a Parr steel autoclave reactor. The autoclave was then put in an oven heated at 170° C. for 9 days with tumbling at 43 rpm. The solid products were recovered from the cooled reactor by centrifugation, washed with deionized water and dried at 95° C.

A portion of the resultant product was calcined according to the following procedure. The zeolite was calcined inside a muffle furnace under a flow of air heated to 595° C. at a rate of 1° C./minute and maintained at 595° C. for 5 hours.

The calcined sample was subjected to a micropore volume analysis using $N_2$ as adsorbate and via the B.E.T. method. The zeolite exhibited a micropore volume of 0.12 cm$^3$/g.

FIG. 1 compares the powder XRD patterns of the as-synthesized and calcined products.

Figure 2:
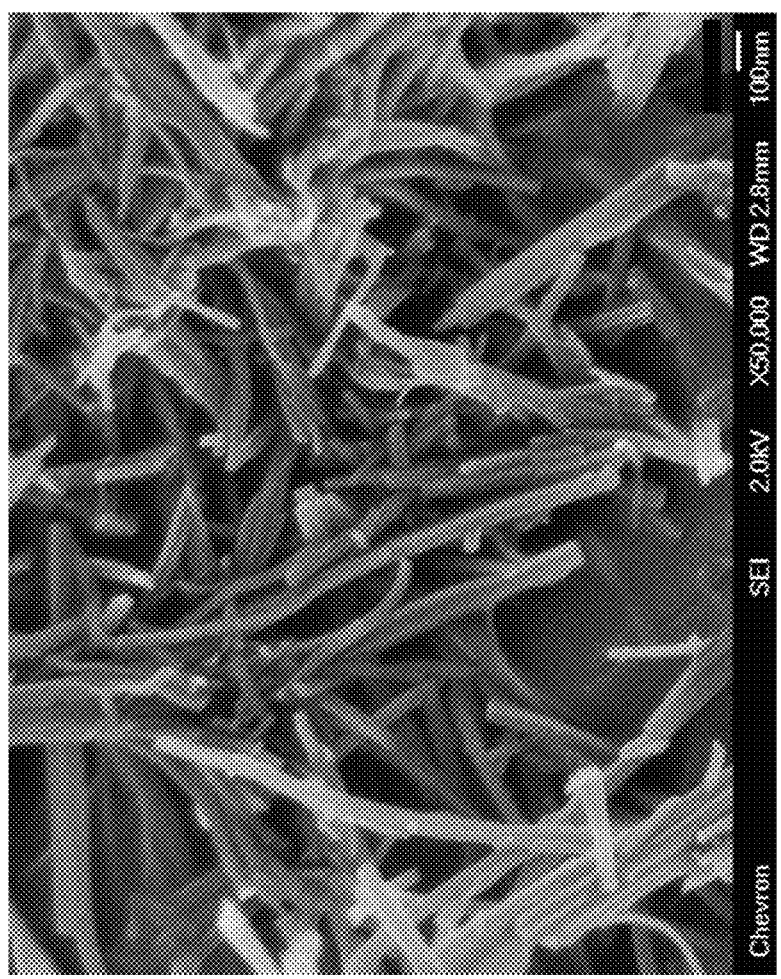
FIG. 2 is a Scanning Electron Micrograph (SEM) image of the as-synthesized zeolite product of Example 1.

FIG. 2 shows a SEM image of the as-synthesized product and indicates a uniform field of crystals.

Example 2

Synthesis of All-Silica SSZ-31

10.72 g of deionized water, 40.63 g of a 20.12% 1-cyclohexylmethyl-1-ethylpiperidinium hydroxide solution (SACHEM, Inc.) and 12.00 g of LUDOX® AS-40 colloidal silica were mixed together in a Teflon liner. The resulting gel was stirred until it became homogeneous. The liner was then capped and placed within a Parr steel autoclave reactor. The autoclave was then put in an oven heated at 170° C. for 8 days with tumbling at 43 rpm. The solid products were recovered from the cooled reactor by centrifugation, washed with deionized water and dried at 95° C.

The resulting zeolite product was identified by powder XRD and SEM as a pure silicate SSZ-31 zeolite.

Example 3

Synthesis of Aluminosilicate SSZ-31

20.68 g of deionized water, 36.29 g of a 20.12% 1-cyclohexylmethyl-1-ethylpiperidinium hydroxide solution (SACHEM, Inc.), 13.64 g of LUDOX® AS-40 colloidal silica and 0.08 g of CBV600 Y-zeolite (Zeolyst International, SiO$_2$/Al$_2$O$_3$ molar ratio=5.1) were mixed together in a Teflon liner. The resulting gel was stirred until it became homogeneous. The liner was then capped and placed within a Parr steel autoclave reactor. The autoclave was then put in an oven heated at 170° C. for 14 days with tumbling at 43 rpm. The solid products were recovered from the cooled reactor by centrifugation, washed with deionized water and dried at 95° C.

The resulting zeolite product was identified by powder XRD and SEM as a pure aluminosilicate SSZ-31 zeolite.

The product had a SiO$_2$/Al$_2$O$_3$ molar ratio of 273, as determined by ICP elemental analysis.

Example 4

Synthesis of Aluminosilicate SSZ-31

1.58 g of deionized water, 2.72 g of a 20.12% 1-cyclohexylmethyl-1-ethylpiperidinium hydroxide solution (SACHEM, Inc.), 0.98 g of LUDOX® AS-40 colloidal silica and 0.03 g of CBV600 Y-zeolite (Zeolyst International, SiO$_2$/Al$_2$O$_3$ molar ratio=5.1) were mixed together in a Teflon liner. The resulting gel was stirred until it became homogeneous. The liner was then capped and placed within a Parr Steel autoclave reactor. The autoclave was then put in an oven heated at 170° C. for 16 days with tumbling at 43 rpm. The solid products were recovered from the cooled reactor by centrifugation, washed with deionized water and dried at 95° C.

The resulting zeolite product was identified by powder XRD and SEM as aluminosilicate SSZ-31 zeolite with a trace amount of amorphous material.

The invention claimed is:

1. A method of synthesizing a zeolite having the structure of SSZ-31, the method comprising:
    (a) preparing a reaction mixture comprising:
        (1) a source of silicon oxide;
        (2) optionally, a source of aluminum oxide;
        (3) a structure directing agent (Q) comprising 1-cyclohexylmethyl-1-ethylpiperidinium cations;
        (4) hydroxide ions; and
        (5) water; and
    (b) subjecting the reaction mixture to crystallization conditions sufficient to form crystals of the zeolite.

2. The method of claim 1, wherein the reaction mixture comprises, in terms of molar ratios, the following:

| | |
|---|---|
| SiO$_2$/Al$_2$O$_3$ | ≥50 |
| Q/SiO$_2$ | 0.05 to 0.50 |
| OH/SiO$_2$ | 0.05 to 0.50 |
| H$_2$O/SiO$_2$ | 10 to 60. |

3. The method of claim 1, wherein the reaction mixture comprises, in terms of molar ratios, the following:

| | |
|---|---|
| SiO$_2$/Al$_2$O$_3$ | 100 to 500 |
| Q/SiO$_2$ | 0.10 to 0.45 |
| OH/SiO$_2$ | 0.20 to 0.45 |
| H$_2$O/SiO$_2$ | 15 to 50. |

4. The method of claim 1, wherein the crystallization conditions include a temperature of from 125° C. to 200° C.

5. A zeolite having the structure of SSZ-31 and comprising 1-cyclohexylmethyl-1-ethylpiperidinium cations in its pores.

6. The zeolite of claim 5, wherein the zeolite has, in its as-synthesized and anhydrous form, a composition comprising the following molar relationship:

| | |
|---|---|
| $SiO_2/Al_2O_3$ | $\geq 50$ |
| $Q/SiO_2$ | >0 to 0.2 | wherein Q comprises 1-cyclohexylmethyl-1-ethylpiperidinium cations.

7. The zeolite of claim 5, wherein the zeolite has, in its as-synthesized and anhydrous form, a composition comprising the following molar relationship:

| | |
|---|---|
| $SiO_2/Al_2O_3$ | 100 to 500 |
| $Q/SiO_2$ | >0 to 0.1 | wherein Q comprises 1-cyclohexylmethyl-1-ethylpiperidinium cations.

\* \* \* \* \*